J. SMITH.
FOOD WARMING CABINET.
APPLICATION FILED FEB. 6, 1911.
1,016,791.
Patented Feb. 6, 1912.
2 SHEETS—SHEET 2.
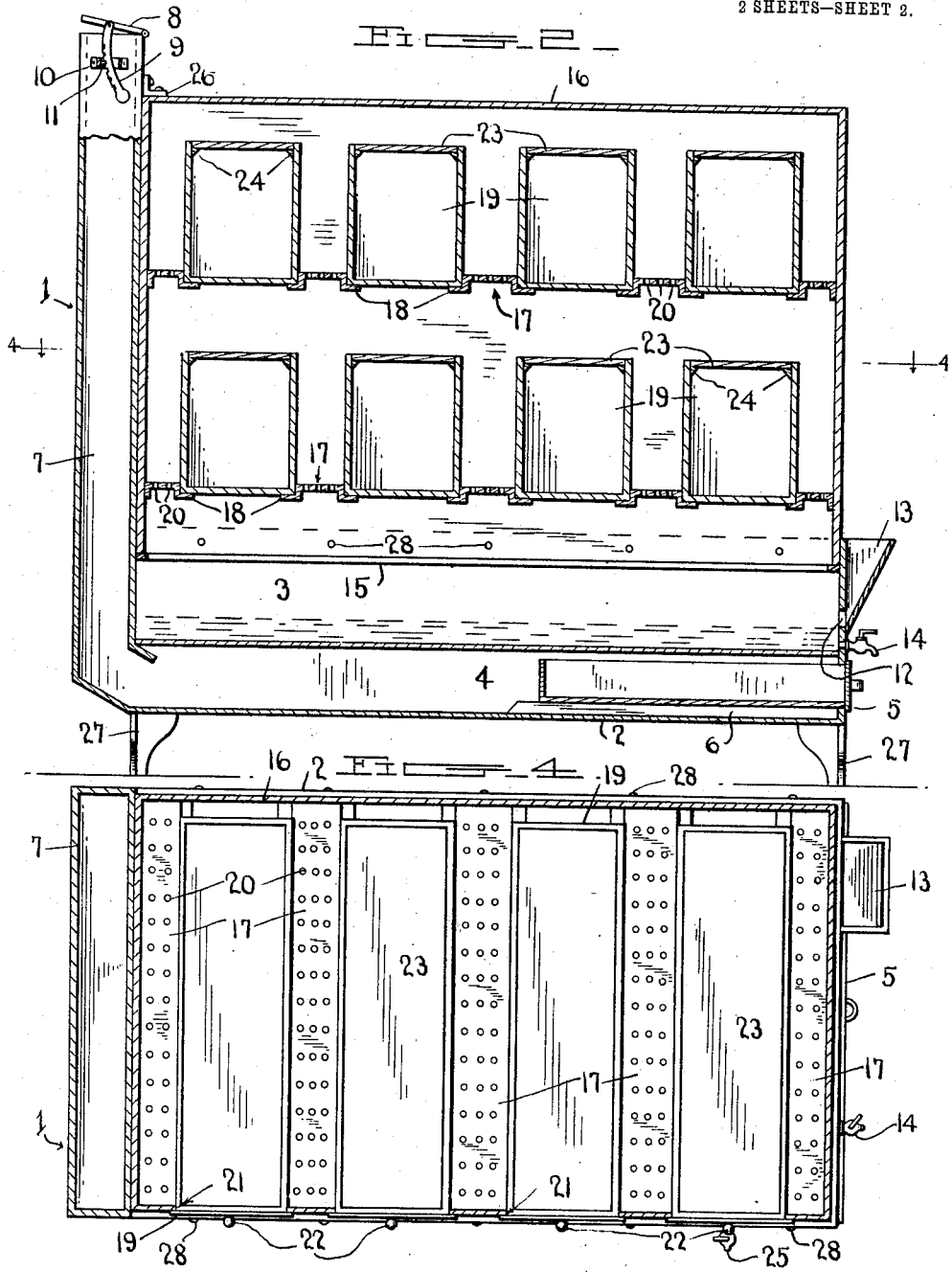
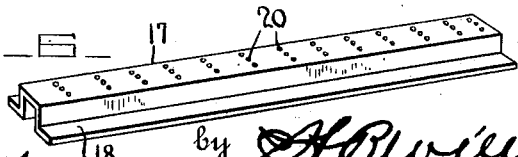

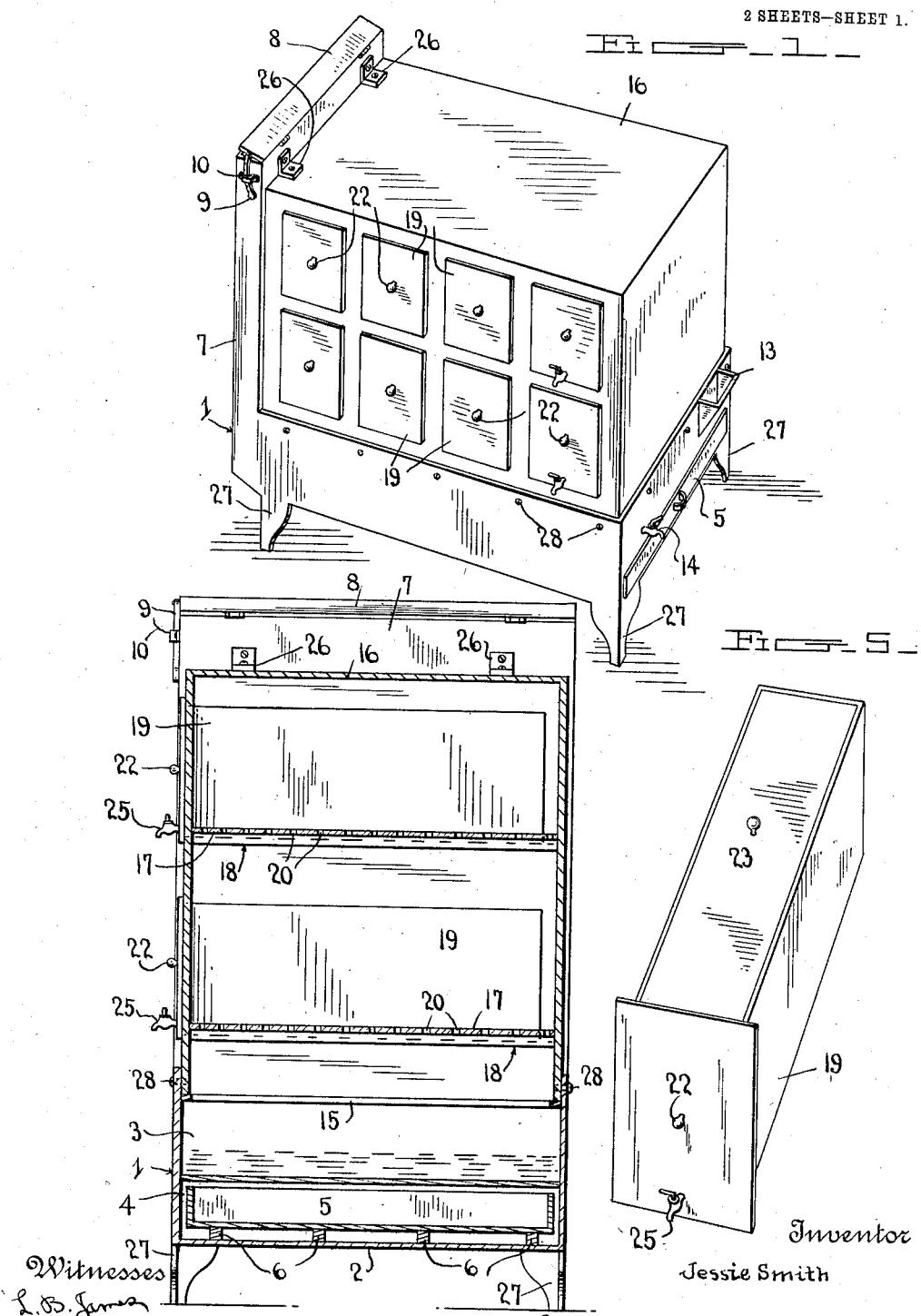

UNITED STATES PATENT OFFICE.

JESSIE SMITH, OF SELMA, ALABAMA.

FOOD-WARMING CABINET.

1,016,791.  Specification of Letters Patent.  Patented Feb. 6, 1912.

Application filed February 6, 1911. Serial No. 606,985.

*To all whom it may concern:*

Be it known that I, JESSIE SMITH, a citizen of the United States, residing at Selma, in the county of Dallas and State of Alabama, have invented certain new and useful Improvements in Food-Warming Cabinets; and I do declare the following to be a full, clear, and exact description of the invention, such as will enable others skilled in the art to which it appertains to make and use the same.

This invention relates to improvements in steam food warming cabinets.

One object of the invention is to provide a steam food warming cabinet having an improved construction of food receptacles whereby food may be warmed and kept in a warm sanitary condition without becoming dried.

Another object of the invention is to provide a warmer of this character having an improved construction and arrangement of heating mechanism whereby the warmer may be economically and efficiently heated and which will operate without smoking.

With these and other objects in view, the invention consists of certain novel features of construction, combination and arrangement of parts as will be more fully described and particularly pointed out in the appended claim.

In the accompanying drawings, Figure 1 is a perspective view of my improved food warming cabinet. Fig. 2 is a vertical longitudinal section thereof. Fig. 3 is a vertical cross section. Fig. 4 is a horizontal section on the line 4—4 of Fig. 2. Fig. 5 is a detail perspective view of one of the food holding drawers of the cabinet; and Fig. 6 is a similar view of one of the perforated supporting plates and guides for the drawers.

Referring more particularly to the drawings, 1 denotes my improved cabinet which comprises a base portion 2 having arranged therein a water tank or compartment 3 open on its upper side and having arranged beneath the same a heating compartment 4 with which is slidably engaged a fuel pan 5. The fuel pan 5 is in the form of a drawer and is adapted to be inserted and drawn out of the compartment 4 through one end of the base 2, as shown. The bottom of the heating compartment 4 is preferably provided with longitudinal ribs 6 with which the pan or drawer 5 is slidably engaged.

With one end of the heating compartment is connected an upwardly extending draft tube 7 which has its upper end extending above the top of the cabinet, as shown. The draft tube 7 is preferably of a width corresponding to the width or depth of the cabinet and on the upper end of said tube is arranged a hinged damper or draft regulating plate 8, which is adapted to be opened to a greater or less extent thereby providing means for controlling the draft through the heating compartment. The plate 8 is supported in its adjusted positions by a segmental rack bar 9 pivotally connected at its upper end to one end of the plate and having its lower portion slidably engaged with a clip 10 in which is arranged a tooth 11, said tooth being adapted to be engaged by the teeth of the rack bar thereby holding the latter and the plate in position. The rack bar 9 is hinged in such manner as to swing by gravity into engagement with the tooth 11.

In one end of the water tank or compartment of the base is arranged a filling opening 12 with which is connected a funnel 13 whereby the tank may be readily supplied with water and whereby the level of the water in the tank will be indicated. In the end of the tank is also arranged a faucet 14 by means of which the water may be drawn from the compartment when desired. On the inner side of the water compartment 3 near the upper edge thereof is formed a right angular inwardly projecting supporting flange 15 with which is adapted to be engaged the main or body portion 16 of the cabinet in which is arranged the food receptacles hereinafter described.

The body portion 16 of the cabinet is preferably constructed in the form of a rectangular box. In said box or body 16 of the cabinet are arranged upper and lower series of drawer-supporting plates 17 on the opposite edges of which are formed downwardly extending rightangular drawer-supporting and guiding flanges 18 with which are adapted to be engaged food holding drawers or receptacles 19. The plates 17 between the drawers are provided with perforations 20 through which steam from the water compartment is adapted to pass and circulate around the drawers. The bottom of the body portion 16 of the cabinet is open, thus permitting the steam and heat from the water in the compartment 3 to pass upwardly through the perforated plates and around the drawers. The drawers 19 are slidably engaged with the supporting plates 17 and flanges 18 and are adapted to be drawn out of the cabinet through suitable openings 21 formed in one side of the body portion 16 for this purpose. On the outer ends of the drawers are preferably arranged suitable handles or knobs 22 whereby the drawers may be readily removed and replaced. If desired the drawers may be provided with suitable lids or covers 23 which are supported on flanges 24 secured to the inner sides of the drawer as shown. One or more of the drawers 19 are adapted to contain beverages or any other liquids which may be desired to be kept warm and said liquid containing drawers are preferably provided on their outer ends with suitable faucets 25 by means of which the liquid may be drawn from the drawers when desired without opening the same. The body portion 16 of the cabinet is secured at the top, near one end, to the adjacent side of the draft tube 7 by angle-iron clips 26, and the base portion of the cabinet is preferably provided with suitable supporting feet 27. The lower end of the body portion 16 is preferably secured to the upper edge of the base portion by screws or similar fastening devices 28.

In the operation of the device any suitable fuel may be placed in the fuel pan or drawer 5 and for this purpose the pan may be withdrawn from the heating compartment 4 and combustion of the fuel started before the pan is again placed in the heating compartment. By thus starting the combustion of the fuel the smoke or gas generated therefrom will be prevented from entering the cabinet. After the combustion of the fuel has thus been started and the pan placed in the heating compartment, the heat from the fuel will quickly heat the water in the tank or water compartment to a sufficient degree to produce steam and the latter, together with the heat drawn off from the water, will circulate through the perforations 20 in the plate 17 and around the drawers, thereby warming and keeping the food in the drawers warm after a long period of time without renewing the fuel.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claim.

Having thus described my invention what I claim is:

In a food warming cabinet, a base having arranged therein a heating compartment and a water tank, a draft tube connected to one end of said heating compartment, a damper arranged on the upper end of said tube, a fuel receptacle having a sliding engagement with said heating compartment whereby said receptacle may be opened and closed, a funnel connected to one end of said water tank, whereby the latter may be filled, a faucet adapted to draw the water therefrom, a food compartment comprising a box having an open bottom and adapted to be arranged over said water tank, a series of perforated drawer supporting plates arranged in said box having drawer supporting flanges formed thereon, drawers having a sliding engagement with said flanges, and covers removably engaged with said drawers.

In testimony whereof I have hereunto set my hand in presence of two subscribing witnesses.

JESSIE SMITH.

Witnesses:
MAXEY C. COOPER,
R. CAMPBELL.

---

Copies of this patent may be obtained for five cents each, by addressing the "Commissioner of Patents, Washington, D. C."